(12) United States Patent
Horikawa et al.

(10) Patent No.: US 7,719,943 B2
(45) Date of Patent: May 18, 2010

(54) INFORMATION RECORDING DEVICE AND INFORMATION RECORDING METHOD

(75) Inventors: Kunihiko Horikawa, Saitama (JP); Akira Shirota, Saitama (JP); Hiroyuki Uchino, Saitama (JP); Shoji Taniguchi, Saitama (JP); Eiji Muramatsu, Saitama (JP)

(73) Assignee: Pioneer Corporation, Tokyo (JP)

( * ) Notice: Subject to any disclaimer, the term of this patent is extended or adjusted under 35 U.S.C. 154(b) by 1029 days.

(21) Appl. No.: 10/577,144

(22) PCT Filed: Oct. 26, 2004

(86) PCT No.: PCT/JP2004/015821

§ 371 (c)(1),
(2), (4) Date: Apr. 26, 2006

(87) PCT Pub. No.: WO2005/041175

PCT Pub. Date: May 6, 2005

(65) Prior Publication Data

US 2007/0133369 A1    Jun. 14, 2007

(30) Foreign Application Priority Data

Oct. 27, 2003    (JP) .............................. 2003-366066

(51) Int. Cl.
*G11B 7/00* (2006.01)
(52) U.S. Cl. .................................... 369/59.11; 369/116
(58) Field of Classification Search ............... 369/59.11
See application file for complete search history.

(56) References Cited

U.S. PATENT DOCUMENTS

| 5,745,467 A * | 4/1998 | Sakaue et al. ............ 369/59.11 |
| 2003/0048724 A1 * | 3/2003 | Sasaki et al. ............ 369/59.11 |
| 2003/0067857 A1 * | 4/2003 | Shirota et al. ............ 369/59.12 |
| 2004/0052177 A1 * | 3/2004 | Maegawa ................. 369/47.51 |

FOREIGN PATENT DOCUMENTS

| JP | 10-64065 | 3/1998 |
| JP | 2003-77128 | 3/2003 |

\* cited by examiner

*Primary Examiner*—Wayne R. Young
*Assistant Examiner*—Van N Chow
(74) *Attorney, Agent, or Firm*—Young & Thompson

(57) ABSTRACT

An information recording device and method capable of forming a recording mark by suppressing thermal interference. The device applies a laser beam to a recording medium and forms a recording mark in accordance with a recording signal. The device includes a light source for emitting the laser beam, signal generation elements for generating a recording pulse signal according to the recording signal, and drive elements for driving the light source according to the recording pulse signal. The recording pulse signal has a mark period for forming the recording mark and a space period. The recording pulse signal makes the level in the entire space period equal to or shorter than a predetermined length and a part of the space period longer than the predetermined length to be off level. While the recording pulse signal is off level, the recording medium is cooled down, thereby suppressing the affect of thermal interference.

8 Claims, 11 Drawing Sheets

RECORDING PULSE WAVEFORM

INFORMATION RECORDING DEVICE AND INFORMATION RECORDING METHOD

TECHNICAL FIELD

This invention relates to a technique for recording information on an optical disc using a laser light or other means.

BACKGROUND TECHNIQUE

Onto a recordable or rewritable optical disc such as a DVD-R (DVD-Recordable) or a DVD-RW (DVD-Rerecordable), information is recorded thereon by irradiating a laser light on a recording surface of the disc. At the areas on the recording surface of the optical disc where the laser light is irradiated, the property of the optical recording medium forming the optical disc is physically changed because of the increased temperature. This produces recording marks on the recording surface.

Namely, the laser light is modulated by recording pulses having time widths corresponding to information to be recorded, so that the laser pulses having lengths corresponding to information to be recorded are generated and irradiated on the optical disc. Thus, recording marks having lengths corresponding to the information to be recorded can be formed on the optical disc.

One approach recently used is control of a laser power to form a recording mark by a pulse train portion having a plurality of short pulses (referred to as "pulse train"), rather than by a single laser pulse. This approach, called "write strategy", introduces less heat accumulation on the recording surface of the optical disc in comparison with the approach irradiating a single recording laser pulse. Therefore, uniform temperature distribution can be achieved on the recording surface on which the recording marks are formed. This can prevent undesired teardrop-shaped recording marks from being formed, and enables the formation of the recording marks of preferred shape.

In the above-mentioned write strategy, there is no problem at the time of normal-speed recording. However, since a clock becomes high speed at the time of high speed recording, control of the recording pulse for driving the recording laser becomes difficult. In this view, there is proposed a technique of using a recording pulse waveform including a top pulse period, a last pulse period and an intermediate bias period therebetween, instead of the recording pulse waveform including the pulse train, at the time of the high speed recording (see Japanese Patent Applications Laid-open under No. 2003-77128 and No. 2003-85753, for example).

Even when the above-mentioned recording pulse waveform is used, there occurs a problem of a thermal interference in such a case that a space period between the continuous recording marks is short or the laser power in the space period is large. The thermal interference is that heat given to the recording surface of the optical disc by irradiation of the recording laser at the time of recording a certain recording mark gives an adverse effect on the recording of the next recording mark as residual heat. If the thermal interference occurs, a starting position and a length of the recording mark formed after the short space period are changed, and a recording mark of an appropriate shape cannot be formed.

DISCLOSURE OF INVENTION

The present invention has been achieved in order to solve the above problems. It is an object of this invention to provide an information recording apparatus and a method thereof capable of effectively preventing occurrence of a thermal interference and forming a recording mark of an appropriate shape.

According to one aspect of the present invention, there is provided an information recording apparatus which irradiates a laser light on a recording medium and forms a recording mark corresponding to a recording signal, including: a light source which emits the laser light; and a signal generating unit which generates a recording pulse signal driving the light source based on the recording signal, wherein the recording pulse signal has a mark period for forming the recording mark and a space period for forming no recording mark, and wherein the recording pulse signal has off levels lower than a bias power level in an entire space period equal to or smaller than a predetermined length and a part of a space period larger than the predetermined length.

The above information recording apparatus can be preferably applied to an optical disc such as a DVD-R, for example. The recording pulse signal is generated based on the recording signal, and the laser light is irradiated onto the recording medium based on the recording pulse signal. Then, the recording mark corresponding to the recording signal is formed, thereby information is recorded. The recording pulse signal has the mark period for forming the recording mark and the space period for forming no recording mark.

In the entire space period equal to or smaller than the predetermined length, the recording pulse signal becomes the off level lower than the bias power level. Additionally, in the part of the space period larger than the predetermined length, the recording pulse signal becomes the off level. While the recording pulse signal is the off level, since the recording medium is cooled down, the adverse effect of the thermal interference can be suppressed. Particularly, during the short space period equal to or smaller than the predetermined length, the thermal interference easily gives the adverse effect on the mark period before and after it. Thus, if the recording pulse signal is the off level in the entire space period, the adverse effect of the thermal interference can be effectively suppressed. In this manner, the recording mark of the preferred shape can be formed.

In a manner of the above information recording apparatus, the recording pulse signal may have the off level at a back end portion in the space period larger than the predetermined length. Thereby, it becomes possible to effectively suppress the adverse effect of the thermal interference to the front end portion of the mark period subsequent to the space period larger than the predetermined length.

In another manner of the above information recording apparatus, the recording pulse may have the off level at a front end portion of the space period larger than the predetermined length. Thereby, it also becomes possible to effectively suppress the adverse effect of the thermal interference to the back end portion of the mark period ahead of the space period larger than the predetermined length.

In a preferred example, the predetermined length may be a shortest space length. In addition, the off level may be a level at which the laser pulse is not emitted from the light source, i.e., a zero level.

In a preferred example, a front end portion of the mark period subsequent to the space period equal to or smaller than the predetermined length may be located behind a front end portion of the mark period subsequent to the space period larger than the predetermined length for each mark period of a same length. The short space period equal to or smaller than the predetermined length is easily affected by the thermal interference as compared with the space period larger than the predetermined length. Therefore, if the front end positions in the subsequent mark period become different between the short space period equal to or smaller than the predetermined length and the space period larger than it, the recording mark of the preferred shape can be formed in the entire space period.

According to another aspect of the present invention, there is provided an information recording method which irradiates a laser light on a recording medium and forms a recording mark corresponding to a recording signal, including: a signal generation process which generates a recording pulse signal based on the recording signal; and an irradiation process which irradiates a laser pulse on the recording medium based on the recording pulse signal, wherein the recording pulse signal has a mark period for forming the recording mark and a space period for forming no recording mark, and wherein the recording pulse signal has off levels lower than a bias power level in an entire space period equal to or smaller than a predetermined length and a part of a space period larger than the predetermined length.

By the above information recording method, similarly to the above information recording apparatus, it becomes possible that the adverse effect of the thermal interference is suppressed and the recording mark of the preferred shape can be formed.

BRIEF DESCRIPTION OF THE REFERENCE NUMBER

Figure 1:
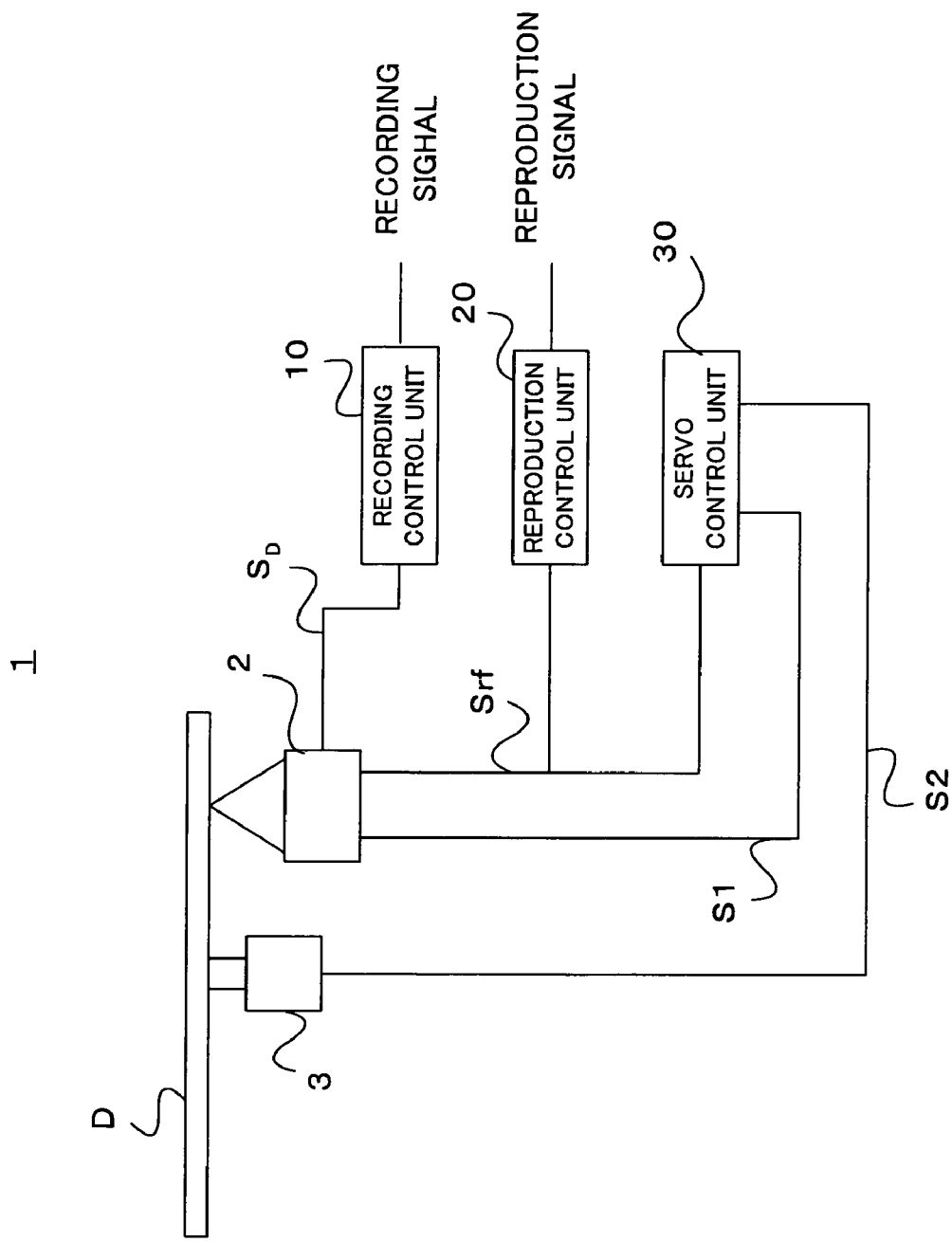
FIG. 1 is a block diagram schematically showing a configuration of an information recording and reproduction apparatus to which the present invention is applied.

1 Information recording and reproduction apparatus
2 Optical pickup
3 Spindle motor
10 Recording control unit
12 LD driver
13 APC circuit
14 Sample hold circuit
15 Controller
16 Front monitor diode
20 Reproduction control unit
30 Servo control unit
40 Top pulse 41 Intermediate bias portion
42 Last pulse
65, 66 and 67 Off-pulse periods

DETAILED DESCRIPTION OF THE PREFERRED EMBODIMENTS

The preferred embodiments of the present invention will now be described below with reference to the attached drawings.

[Configuration of Apparatus]

FIG. 1 schematically shows a whole configuration of the information recording and reproduction apparatus according to the embodiment of the present invention. An information recording and reproduction apparatus 1 records the information on an optical disc D, and reproduces the information from the optical disc D. For example, the optical disc D may be a CD-R (Compact Disc-Recordable) and a DVD-R for recording only once, and a CD-RW (Compact Disc-Rewritable) and a DVD-RW that allow for repeated erasing and recording of information.

The information recording and reproduction apparatus 1 includes an optical pickup 2 which irradiates a recording beam and a reproducing beam on the optical disc D, a spindle motor 3 which controls rotation of the optical disc D, a recording control unit 10 which controls the recording of the information on the optical disc D, a reproduction control unit 20 which controls reproduction of the information already recorded on the optical disc D, and a servo control unit 30 which executes various kinds of servo control including a spindle servo which controls rotation of the spindle motor 3, and a focus servo and a tracking servo, both of which are relative position control of the optical pickup 2 with respect to the optical disc D.

The recording control unit 10 receives the recording signal and generates a driving signal $S_D$ for driving a laser diode inside the optical pickup 2 by a process described below, and supplies the signal $S_D$ to the optical pickup 2.

The reproduction control unit 20 receives a read-out RF signal Srf which is outputted from the optical pickup 2, and generates and outputs a reproduction signal by executing a predetermined demodulating process and a decoding process to the signal Srf.

The servo control unit 30 receives the read-out RF signal Srf from the optical pickup 2, and, based on the signal, supplies a servo signal S1 such as a tracking error signal and a focus signal to the optical pickup 2, and also supplies a spindle servo signal S2 to the spindle motor 3. Thus, various kinds of servo processes, such as a tracking servo, a focus servo and a spindle servo, are executed.

In the present invention, which mainly relates to the recording method by the recording control unit 10, various kinds of known methods can be applied to the reproduction control and the servo control. Therefore, explanations thereof are not given in detail here.

Though FIG. 1 illustrates the information recording and reproduction apparatus as the embodiment of the present invention, it is also possible to apply the present invention to an information recording apparatus dedicated to recording.

Figure 2:
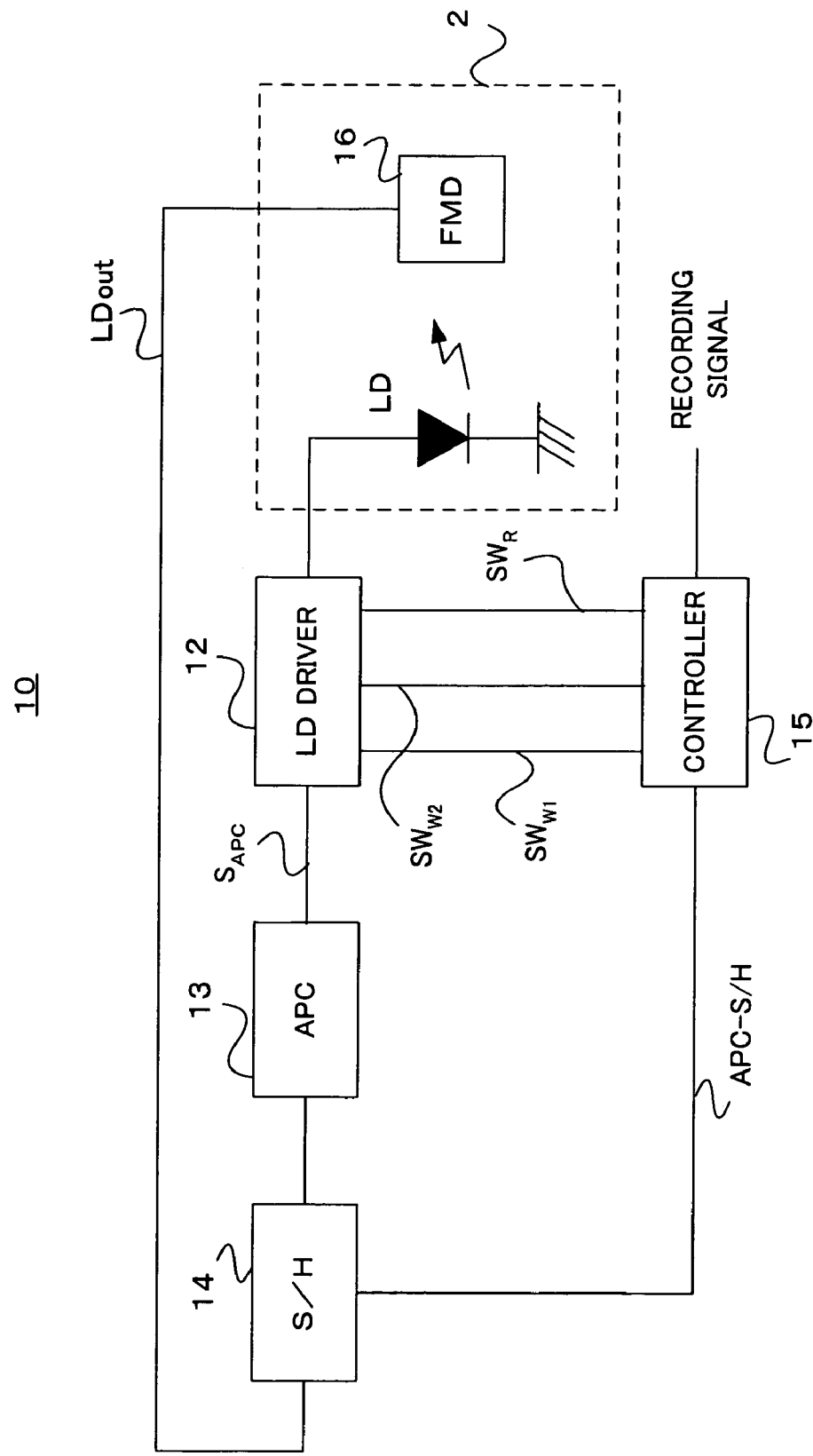
FIG. 2 is a block diagram showing a configuration of a recording control unit shown in FIG. 1.

FIG. 2 shows internal configurations of the optical pickup 2 and the recording control unit 10. As shown in FIG. 2, the optical pickup 2 includes a laser diode LD which generates the recording beam for recording the information on the optical disc D and the reproducing beam for reproducing the information from the optical disc D, and a front monitor diode (FMD) 16 which receives the laser light emitted from the laser diode LD and outputs a laser power level signal LDout corresponding to the laser light.

The optical pickup 2 additionally includes a light detector which receives a reflected beam of the reproducing beam by the optical disc D to generate the read-out RF signal Srf, and well-known components such as an optical system which guides the recording beam, the reproducing beam and the reflected beam to appropriate directions. However, drawings and detailed explanations thereof are omitted here.

On the other hand, the recording control unit 10 includes a laser diode (LD) driver 12, an APC (Automatic Power Control) circuit 13, a sample hold (S/H) circuit 14 and a controller 15.

The LD driver 12 supplies, to the laser diode LD, the current corresponding to the recording signal, and records the information on the optical disc D. The front monitor diode 16, which is provided near the laser diode LD in the optical pickup 2, receives the laser light emitted from the laser diode LD and outputs the laser power level signal LDout indicating a level thereof.

A sample hold circuit 14 samples and holds the level of the laser power level signal LDout at timing prescribed by a sample hold signal APC-S/H. Based on the output signal of the sample hold circuit 14, the APC circuit 13 executes power control of the LD driver 12 so that the bias power level of the laser light emitted from the laser diode LD is constant.

The controller 15 mainly performs a recording operation and an APC operation. First, the recording operation will be explained. In the recording operation, the controller 15 generates switching signals $SW_R$, $SW_{W1}$ and $SW_{W2}$ of the switches which control a current quantity supplied to the laser diode LD, and supplies them to the LD driver 12.

Figure 3:
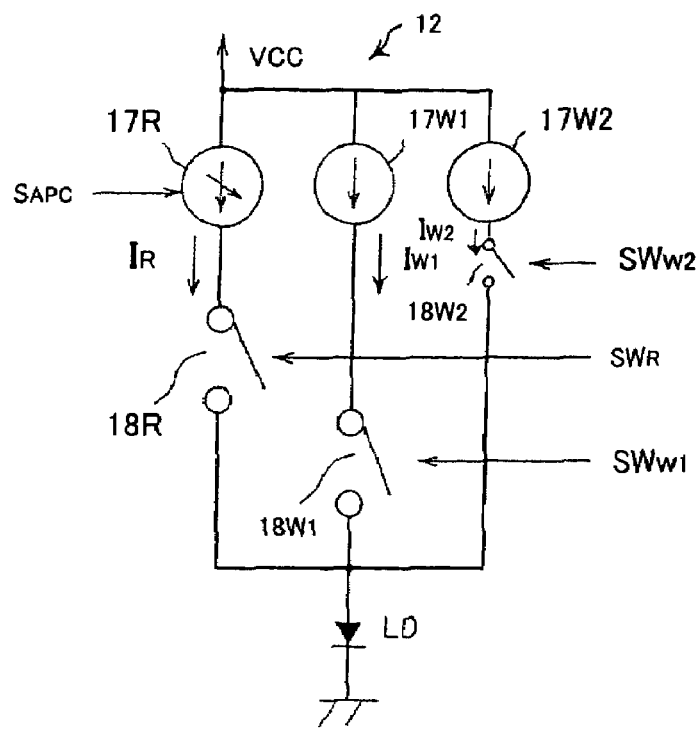
FIG. 3 is a diagram showing a configuration of an LD driver shown in FIG. 2.

FIG. 3 shows a detailed configuration of the LD driver 12. As shown in FIG. 3, the LD driver 12 includes a current source 17R for a bias level, current sources 17W1 and 17W2 for a write level, and switches 18R, 18W1 and 18W2.

The current source 17R for the bias level flows a driving current $I_R$ for making the laser diode LD emit the laser light with the bias power, and the driving current $I_R$ is supplied to the laser diode LD via the switch 18R. Therefore, when the switch 18R is set to an ON state, the driving current $I_R$ of the bias power is supplied to the laser diode LD. When the switch 18R is set to an OFF state, supplying of the driving current $I_R$ is stopped. The quantity of the driving current $I_R$ from the current source 17R varies by a control signal SAPC.

The current sources 17W1 and 17W2 for the write level flow driving current $I_{W1}$ and $I_{W2}$, to the laser diode LD, for emitting the laser light with the write power respectively. The driving current $I_{W1}$ is supplied to the laser diode LD via the switch 18W1, and the driving current $I_{W2}$ is supplied to the laser diode LD via the switch 18W2.

Figure 5:
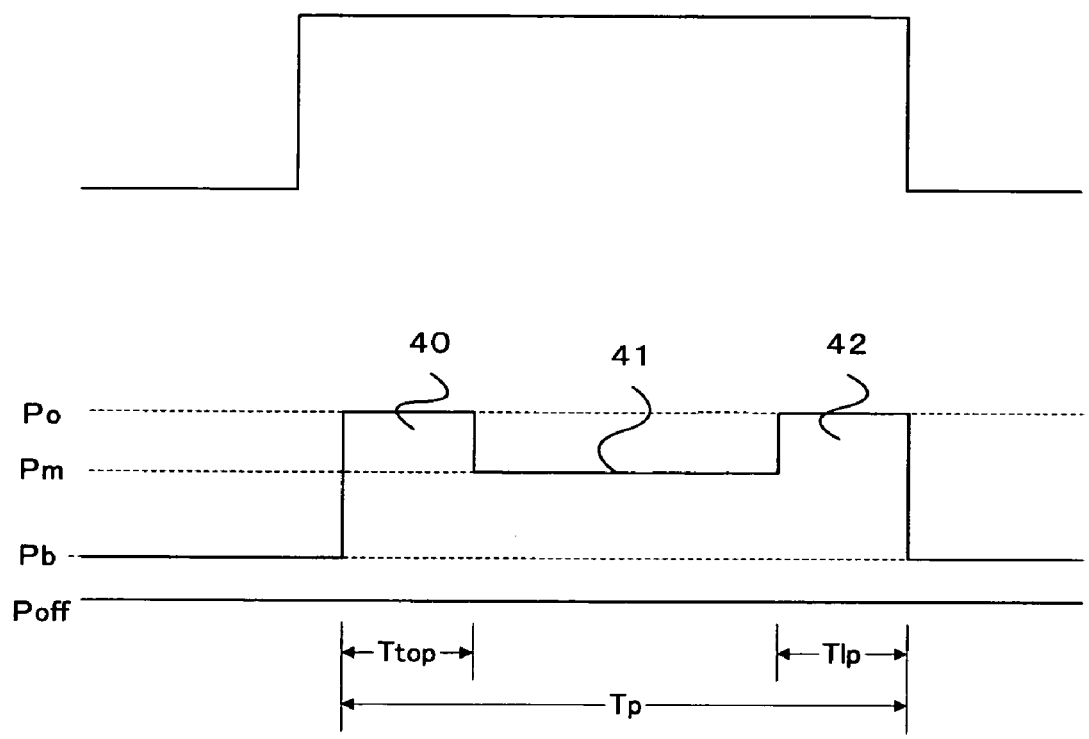
FIG. 5 is a waveform diagram showing a basic strategy.

In the write strategy according to the present invention, two levels of write powers, i.e., a first write power Po and a second write power Pm lower than the first write power Po, are used (see FIG. 5). When the switch 18W1 is set to the ON state with the switch 18R in the ON state, a total driving current of the driving currents $I_R$ and $I_{W1}$ is supplied to the laser diode LD. Thereby, the laser diode is driven by the second write power Pm. In addition, when the switch 18W2 is set to the ON state with the switches 18R and 18W1 in the ON state, the driving current $I_{W2}$ is additionally supplied to the laser diode LD. As a result, a total driving current of the driving currents $I_R$, $I_{W1}$ and $I_{W2}$ is flown to the laser diode LD, and the laser diode LD is driven by the first write power Po. When the switch 18W1 is set to the OFF state, the supply of the driving current $I_{W1}$ is stopped. When the switch 18W2 is set to the OFF state, the supply of the driving current $I_{W2}$ is stopped.

Figure 4:
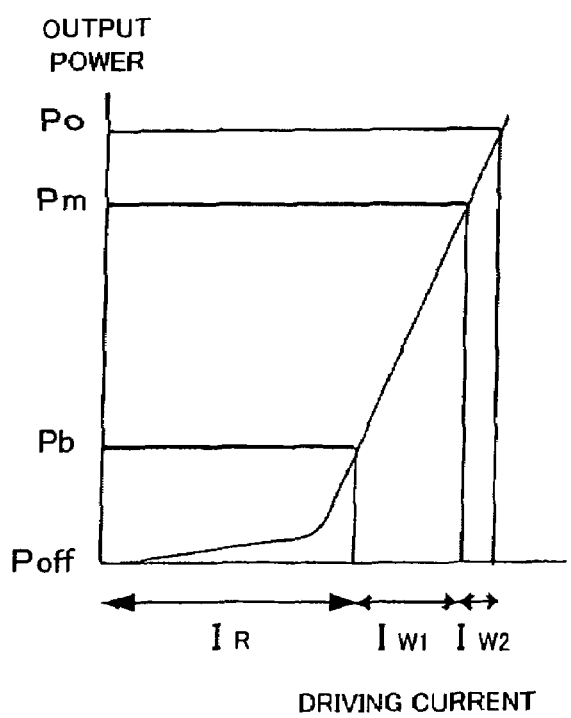
FIG. 4 is a graph showing a relation between a driving current given to an LD and an output power.

FIG. 4 shows are a relation between the driving current supplied to the laser diode LD and the output power of the laser light emitted from the laser diode LD. As understood from FIG. 4, when the driving current $I_R$ is supplied to the laser diode LD, the laser light is emitted with the bias power Pb. In that state, by further adding the driving current $I_{W1}$, the laser light is emitted with the second write power Pm. By further adding the driving current $I_{W2}$, the laser light is emitted with the first write power Po.

At the time of recording the information on the optical disc, basically, the driving current $I_R$ is always supplied, and the laser light is emitted with the bias power Pb. Additionally, if the driving currents $I_{W1}$ and $I_{W2}$ are added in accordance with the recording pulse, the first write power Po or the second write power Pm is applied, and the information is recorded on the optical disc.

Next, the APC operation will be explained. The APC operation is for adjusting the driving current level supplied from the LD driver 12 to the laser diode LD so that the level of the bias power of the laser light outputted by the laser diode LD becomes constant. In detail, in a long space period (e.g., 5T to 11T and 14T space periods) of the space portion of the recording signal (which is 8-16 modulated, and which has the mark period and the space period of 3T to 11T and 14T lengths), the driving signal $S_D$ from the recording control unit 10 is adjusted so that the level of the bias power Pb is constant.

Concretely, the APC operation is performed as follows. The controller 15 generates the recording pulse corresponding to the recording signal as described above, and drives the LD driver 12 by the recording pulse to emit the laser light from the laser diode LD.

The front monitor diode 16, which is provided near the laser diode LD in the optical pickup 2, receives the laser light emitted from the laser diode LD, and generates the laser power level signal LDout indicating its level to supply it to the sample hold circuit 14.

The sample hold circuit 14 samples the laser power level signal LDout supplied from the front monitor diode 16 at the timing given by the sample hold signal APC-S/H inputted from the controller 15, and holds its level for a predetermined period. The sample hold signal APC-S/H outputted from the controller 15 is a pulse indicating a period (referred to as "APC period") in which the APC is executed.

Thus, the sample hold circuit 14 holds the level of the laser power level signal LDout in the APC period in the space period of the recording signal, and supplies it to the APC circuit 13. The APC circuit 13 supplies the control signal $S_{APC}$ to the LD driver 12 so that the level of the laser power level signal LDout in the APC period becomes constant.

As shown in FIG. 3, the control signal $S_{APC}$ is inputted to the current source 17R for the bias level in the LD driver 12. Thereby, in accordance with the control signal $S_{APC}$, the current $I_R$ flowing from the current source 17R for the bias level varies. Namely, the APC is executed so that the bias power level obtained by the laser diode LD becomes constant.

[Write Strategy]

Next, the write strategy according to the present invention will be explained.

(Basic Write Strategy)

First, FIG. 5 shows the recording pulse waveform by a basic write strategy. As shown in FIG. 5, the recording pulse waveform by the basic write strategy is formed by three portions, i.e., a top pulse 40, an intermediate bias portion 41 and a last pulse 42. In portions other than those portions, the recording pulse waveform is maintained at the level of the bias power Pb.

The write powers of two values are utilized for the basic write strategy. The top pulse 40 and the last pulse 42 have the first write power Po, and the intermediate bias portion 41 has the second write power Pm. Though the second write power Pb is higher than the bias power Pb, it is set to be lower than the first write power Po.

The top pulse 40 preheats the recording surface of the optical disc, and forms the mark starting portion for the purpose of recording the mark. A time width of the intermediate bias portion 41 varies in accordance with the length of the recording data. The last pulse 42 mainly has a function to adjust a shape of the back end portion of the mark. Basically, the length of the formed recording mark is controlled by a top pulse width Ttop, a last pulse width T1p, a width Tp from the front end portion of the top pulse to the back end portion of the last pulse, and the first write power Po, and the width of the formed recording mark is controlled by the second write power Pm.

Figure 6:
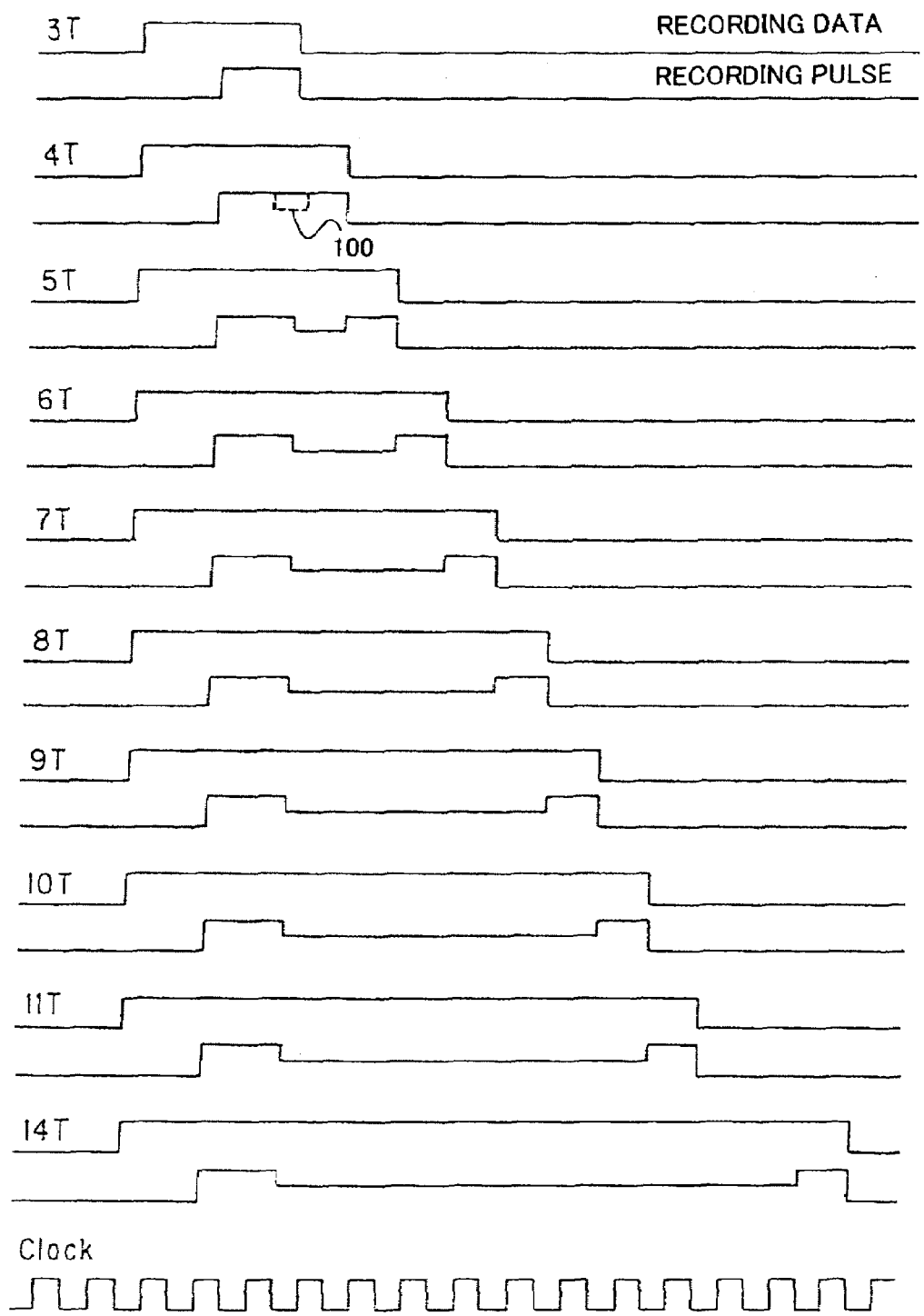
FIG. 6 is a waveform diagram showing recording pulse waveforms of respective mark lengths by a basic strategy.

FIG. 6 shows the recording pulse waveform corresponding to each mark length to be recorded. The recording data is 8-16 modulated, and has the mark period and the space period of 3T to 11T and 14T lengths. As shown in FIG. 6, a front edge of the recording pulse waveform is always located behind the front edge of the recording data, irrespective of the mark length. The recording pulse waveforms of the recording data of 3T and 4T do not have the intermediate bias portion 41, and the top pulse 40 and the last pulse 42 are synthesized to form the single pulse. The power of this pulse is the first write power Po, which is identical to the powers of the top pulse and the last pulse.

When the recording data is equal to or larger than 5T, the length of the intermediate bias portion 41 increases in accordance with each length. The pulse widths of the top pulse 40 and the last pulse 42 are basically almost constant respectively, and the widths do not have to be largely varied in accordance with the recording data length, differently from the intermediate bias portion 41.

In the example of FIG. 6, when the recording data is 4T, the top pulse and the last pulse are synthesized to form the single pulse waveform. However, as shown by a broken line 100 in FIG. 6, when the recording data is 4T, the recording pulse waveform can also be determined so that the intermediate bias portion is provided.

(Improved Write Strategy)

Next, a description will be given of an improved write strategy according to the present invention. Based on the above-mentioned basic write strategy, the improved write strategy is determined in order to remove the adverse effect of the thermal interference.

Now, the thermal interference will be briefly explained. The thermal interference is that the heat given to the recording surface of the optical disc by the irradiation of the recording laser at the time of recording a certain mark gives the adverse effect to the next mark recording as residual heat. As the space between the two successive marks becomes shorter, the thermal interference more easily occurs. As the space between them becomes longer, the thermal interference less easily occurs. A reason thereof is below. When the space between one mark and the next mark thereof is long, since the recording surface of the optical disc is cooled down therebetween, the residual heat becomes small at the time of the next mark recording. Meanwhile, when the space between one mark and the next mark thereof is short, the recording laser for the next mark recording is irradiated before the recording surface of the optical disc is cooled down. Thus, the mark next to the short space is easily affected by the thermal interference. Due to the adverse effect of the thermal interference, the front end portion of the mark next to the short space extends forward, and the mark length becomes long. Hence, in the improved write strategy which will be described below, the strategy is designed so that the adverse effect of the thermal interference is removed.

Figure 7:
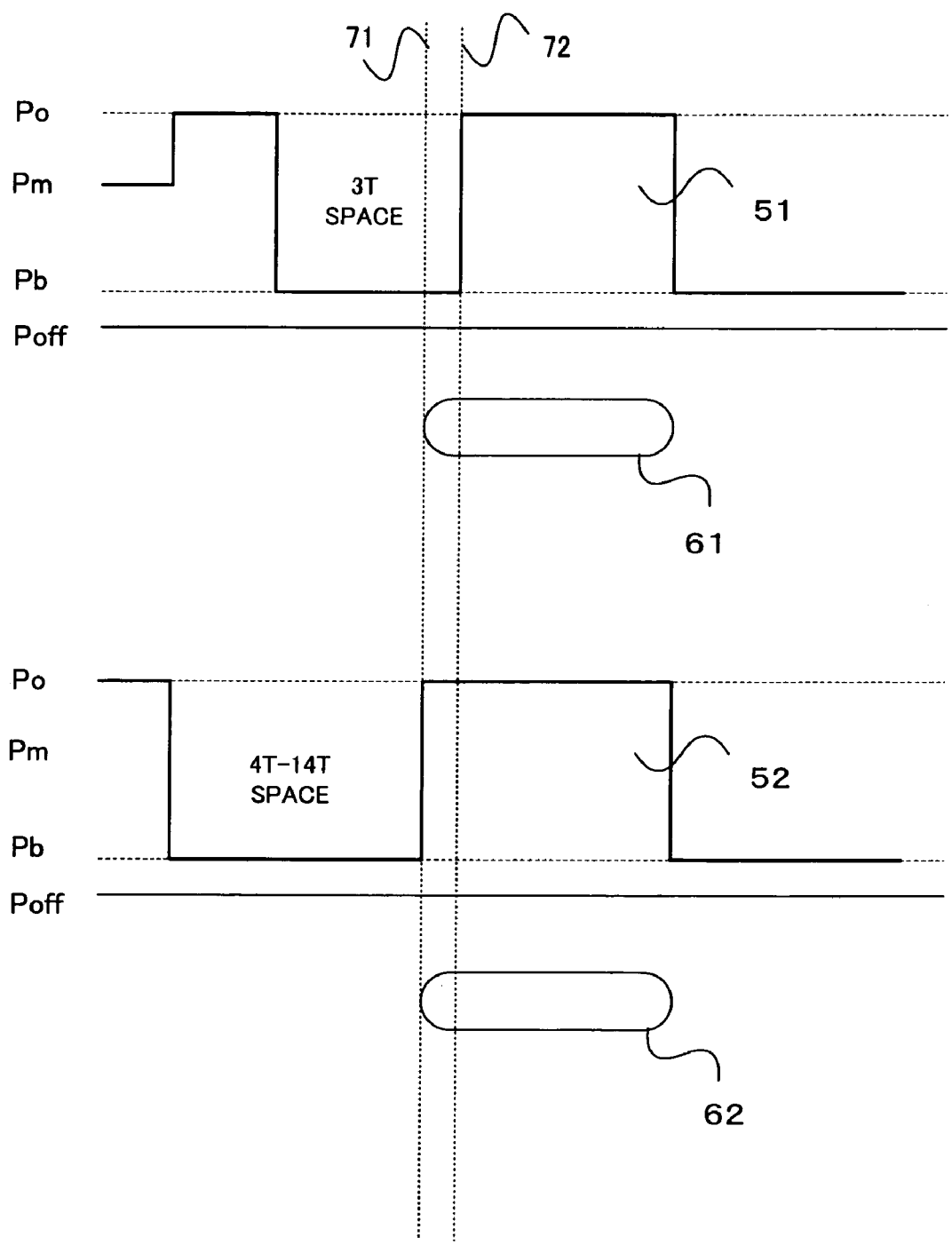
FIG. 7 shows an example of a strategy having no off-pulse period.

First, FIG. 7 shows such a state that the recording pulse waveform of the above-mentioned basic strategy is adjusted. In FIG. 7, an upper part shows the recording state of the mark next to 3T space, and a lower part shows the recording state of the mark next to 4T to 14T space. FIG. 7 is a diagram conceptually showing a relation between the recording pulse waveform and the mark recording state (recording position), and it does not show the recording position on the actual disc. In the adjustment shown in FIG. 7, the positions of the front end portions of the recording pulse waveforms are different between the mark next to the 3T space and the mark next to the 4T to 14T space. Namely, while the front end portion of a recording pulse 51 corresponding to a mark 61 next to the 3T space is located at a position on a line segment 72, the front end portion of a recording pulse 52 corresponding to a mark 62 next to the 4T to 14T space is located at a position on a line segment 71. The mark 61 is as long as the mark 62. A shift between the line segment 71 and the line segment 72 may be about 0.05T, for example.

As described above, the front end portion of the mark next to the 3T space tends to extend forward due to the adverse effect of the thermal interference. Therefore, in FIG. 7, if it is set that the recording pulse 51 corresponding to the mark 61 next to the 3T space starts from the position of the line segment 71, the front end portion of the mark 61 extends forward, and the mark length actually formed becomes longer than the mark 62 next to the 4T to 14T space. Thus, as shown at the upper part in FIG. 7, the front end portion of the recording pulse 51 corresponding to the mark 61 next to the 3T space is located behind the front end portion of the recording pulse 52 corresponding to the mark 62 next to 4T to 14T space. A positional relation between the front end portion of the recording pulse 51 and the front end portion of the recording pulse 52 is relatively determined. The position of the front end portion of the recording pulse 52 is located forward with respect to the position of the front end portion of the recording pulse 51, and the position of the front end portion of the recording pulse 51 is located backward with respect to the position of the front end portion of the recording pulse 52.

In this manner, if the front end portion of the recording pulse corresponding to the mark next to the 3T space is located backward with respect to the front end portion of the recording pulse corresponding to the mark next to the 4T to 14T space, it can be prevented that the mark lengths become different between the mark next to the 3T space and the mark next to the 4T to 14T space due to the adverse effect of the thermal interference.

Figure 8:
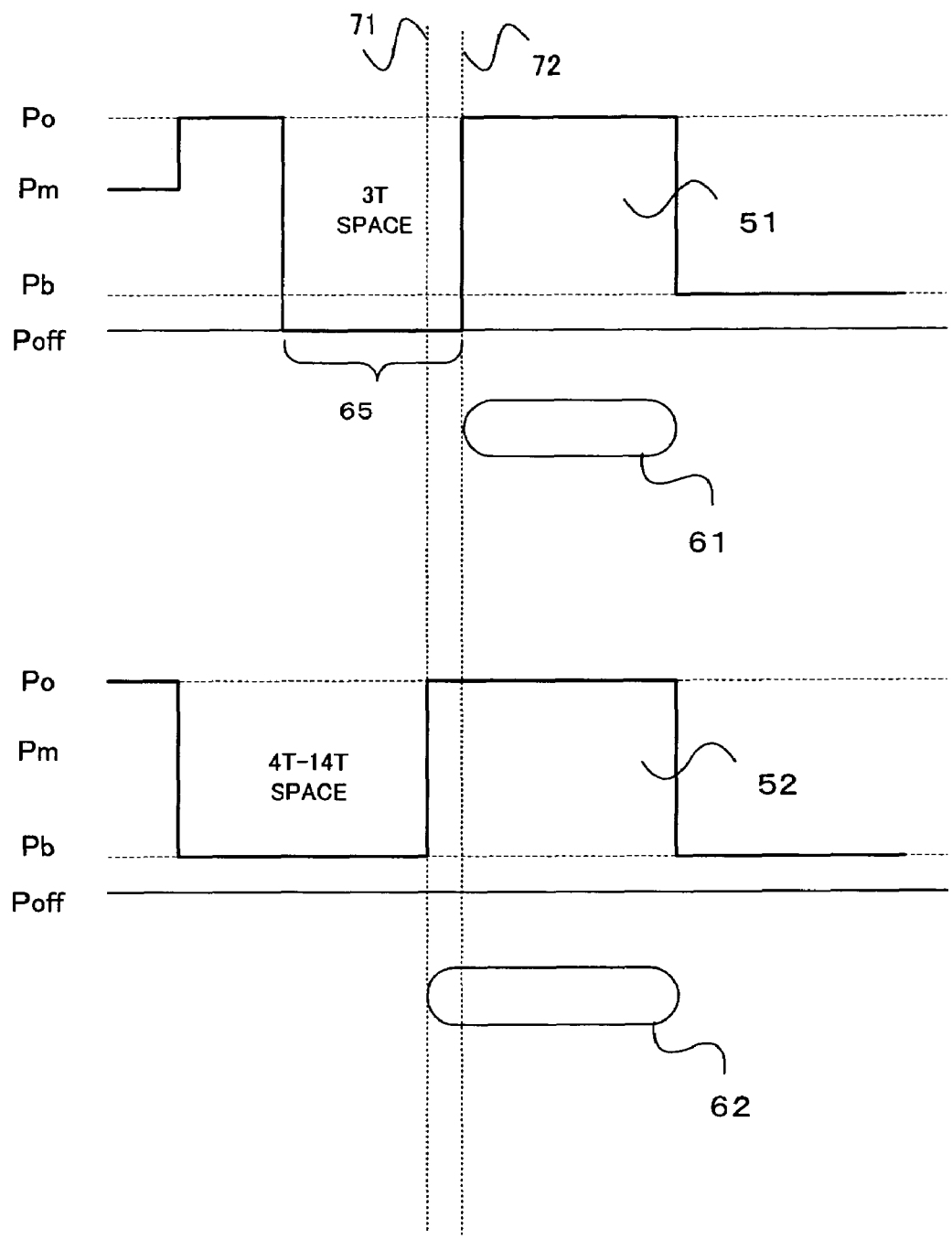
FIG. 8 shows an example of a strategy in such a case that 3T space is set to an off-pulse period.

However, in this case, as shown in FIG. 7, the laser light is irradiated at the bias power level Pb during the period of the 3T space. Thus, in order to further suppress the adverse effect of the thermal interference, it is effective to set the laser to the off state during the space period. FIG. 8 shows this manner. In FIG. 8, an upper part shows the recording state of the mark next to the 3T space, and a lower part shows the recording state of the mark next to the 4T to 14T space. FIG. 8 is also a diagram conceptually showing the relation between the recording pulse waveform and the mark recording state (recording position).

As understood by comparing the upper portion in FIG. 7 and the upper portion in FIG. 8, in the recording pulse in FIG. 8, the laser power is set to the off level Poff (i.e., the laser driving current is set to 0 and the laser is set to the off state) during the period of the 3T space. The period during which the laser power is set to the off level Poof is referred to as "off-pulse period", hereinafter. At the upper part in FIG. 8, the entire 3T space is prescribed as an off-pulse period 65. Thereby, as shown in FIG. 8, the adverse effect of the thermal interference is further suppressed, and the front end portion of the formed mark 61 goes back to the position of the line segment 72. This is because the adverse effect of the thermal interference is reduced and the extension of the front end portion of the formed mark 61 is suppressed. In this manner, in the 3T space easily receiving the adverse effect of the thermal interference, if the laser power is set to the off level Poff, the adverse effect of the thermal interference can be effectively suppressed.

However, if the laser power is set to the off level Poff only in the 3T space, as understood by FIG. 8, the mark length thereof problematically becomes different from the mark length of the mark next to the 4T to 14T space. The lower part in FIG. 8 is similar to the lower part in FIG. 7, and during the period of the 4T to 14T space, the laser power is maintained to the bias power Pb. While the front end portion of the mark 62 next to the 4T to 14T space is located at the position on the line segment 71, the front end portion of the mark 61 next to the 3T space is located at the position on the line segment 72. Therefore, even though the mark is same, the mark length problematically becomes different dependently on whether it is formed next to the 3T space or 4T to 14T space.

Figure 9:
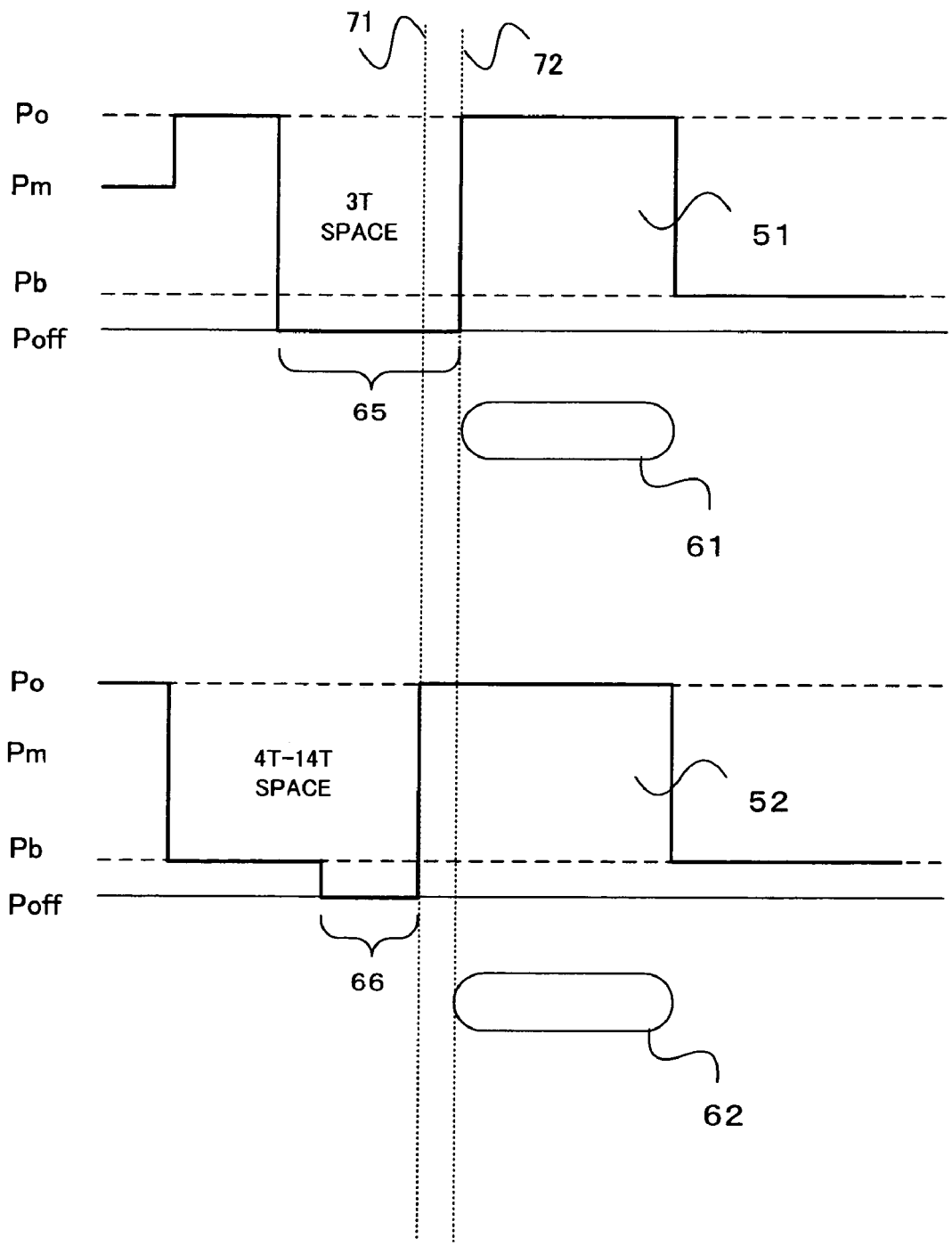
FIG. 9 shows a strategy in such a case that an off-pulse period according to the present invention is set.

Therefore, as shown in FIG. 9, in the 4T to 14T space, the off-pulse period is partly provided. In FIG. 9, an upper part shows the recording state of the mark next to the 3T space, and a lower part shows the recording state of the mark next to the 4T to 14T space. FIG. 9 is also a diagram conceptually showing the relation between the recording pulse waveform and the mark recording state (recording position).

The upper part in FIG. 9 is similar to the upper part in FIG. 8. Namely, the 3T space period is set to the off-pulse period 65 during which the laser power is decreased to the off level Poof. Thereby, the adverse effect of the thermal interference is suppressed, and the front end portion of the formed mark 61 is positioned on the line segment 72.

On the other hand, as shown at the lower part in FIG. 9, during the period of the 4T to 14T, an off-pulse period 66 is provided at the back end portion, and the laser power level is decreased to Poff. However, the off-pulse period 66 is only a part of the period of the 4T to 14T space, and it is not the whole space period unlike the case of the 3T space. Thus, as shown at the lower part in FIG. 9, if the off-pulse period is provided to the mark next to the 4T to 14T space, the adverse effect of the thermal interference can be further suppressed.

In this manner, in the improved strategy of the present invention, as shown in FIG. 9, the laser power is decreased to the off level Poff during the entire period in the 3T space period. Meanwhile, the laser power is decreased to the off level Poff at the back end portion only during the predetermined period in the 4T to 14T space period. Thereby, in any space lengths, the adverse effect of the thermal interference can be effectively suppressed by introducing the off-pulse period. In addition, as understood as compared with FIG. 7, in the improved strategy shown in FIG. 9, it is simultaneously applied to adjust the recording pulse waveform explained in FIG. 7 (i.e., to arrange the front end position of the recording pulse 51 relatively backward with respect to the front end position of the recording pulse 52). Thus, the effect of suppressing of the thermal interference by the adjustment of the pulse waveform can be simultaneously obtained.

The length of the off-pulse period 66 in the 4T to 14T space period may be constant irrespective of the space length or the next mark length, and it may be changed in correspondence with the space length or the next mark length. For example, when the length of the off-pulse period 66 is changed in accordance with the space length, the off-pulse periods 66 in the 4T space and 14T space may be to 1.25T and 0.85T, respectively, and the off-pulse period in the space therebetween may be set to the value therebetween. In addition, when the length of the off-pulse period 66 is changed in accordance with the next mark length, it can be determined that the off-pulse period 66 in such a case that the next mark is 3T is 1.25T and the off-pulse period 66 in such a case that the next mark is 14T is 0.85T.

In the LD driver 12 explained with reference to FIG. 2 and FIG. 3, the off-pulse periods 65 and 66 can be realized by setting all of the switches SWW1, SWW2 and SWR to the off state and setting their driving currents to 0. Thereby, as shown in FIG. 4, when the driving current is 0, the laser output power is set to the off level Poff.

Figure 10:
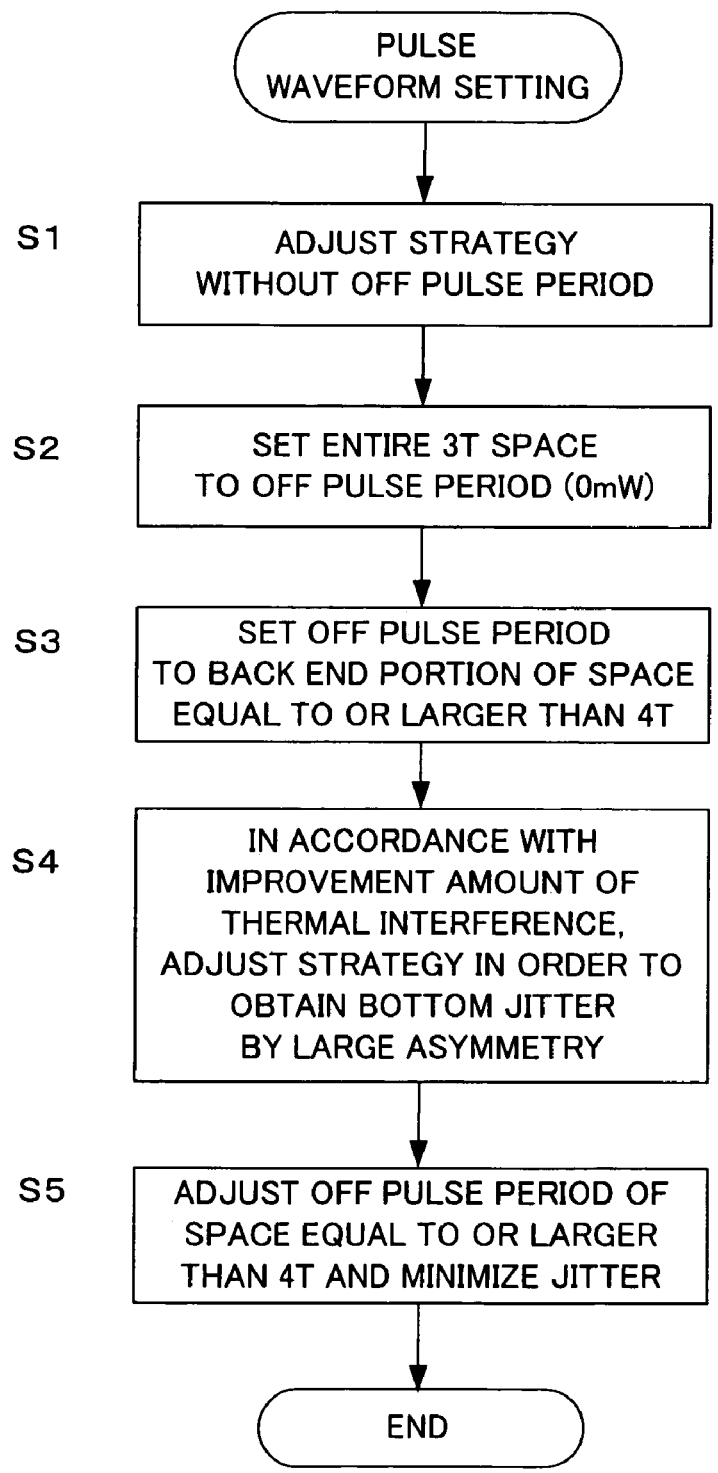
FIG. 10 is a flow chart showing a setting process of a pulse waveform according to the present invention.

A description will be given of a concrete setting process of the recording pulse waveform (strategy) by the above-mentioned improved strategy of the present invention, with reference to FIG. 10. First, as shown in FIG. 7, the recording pulse waveform (strategy) is adjusted without setting the off-pulse period (step S1). Next, as shown in FIG. 8, the entire 3T space is set to the off-pulse period (step S2). Further, as shown in FIG. 9, the off-pulse period 66 is set to the back end of the space equal to or larger than 4T (step S3). Next, the strategy is adjusted to the recording pulse waveform thus obtained in accordance with the improved amount of the thermal interference so that bottom jitter is obtained by large asymmetry (step S4). Finally, the off-pulse period of the space equal to or larger than 4T is adjusted, and the jitter is minimized (step S5). In this manner, the setting of the recording pulse waveform ends.

Figure 11:
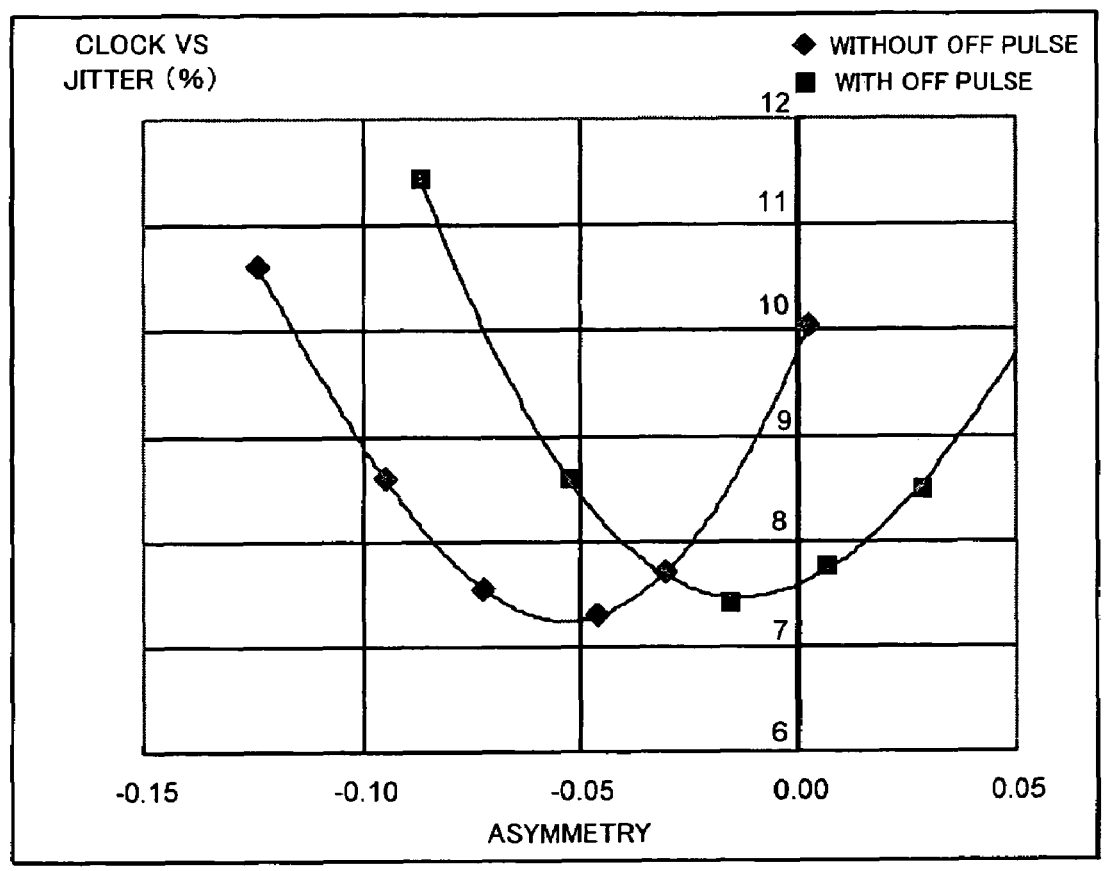
FIG. 11 is a graph showing a relation between asymmetry and jitter according to the strategy of the present invention.

FIG. 11 shows characteristics of the recording pulse waveform thus obtained and the recording pulse waveform including no off-pulse period, which is shown in FIG. 7. In FIG. 11, a horizontal axis indicates the asymmetry, and a vertical axis shows a clock versus jitter ratio. When the off-pulse period shown in FIG. 7 is not used, the asymmetry at the position (also referred to as "bottom jitter") of the minimal clock versus jitter ratio is about −0.05. When the off-pulse period shown in FIG. 9 is used, the asymmetry at the bottom jitter is about −0.01, which shows improvement about +0.04.

(Modification)

Figure 12:
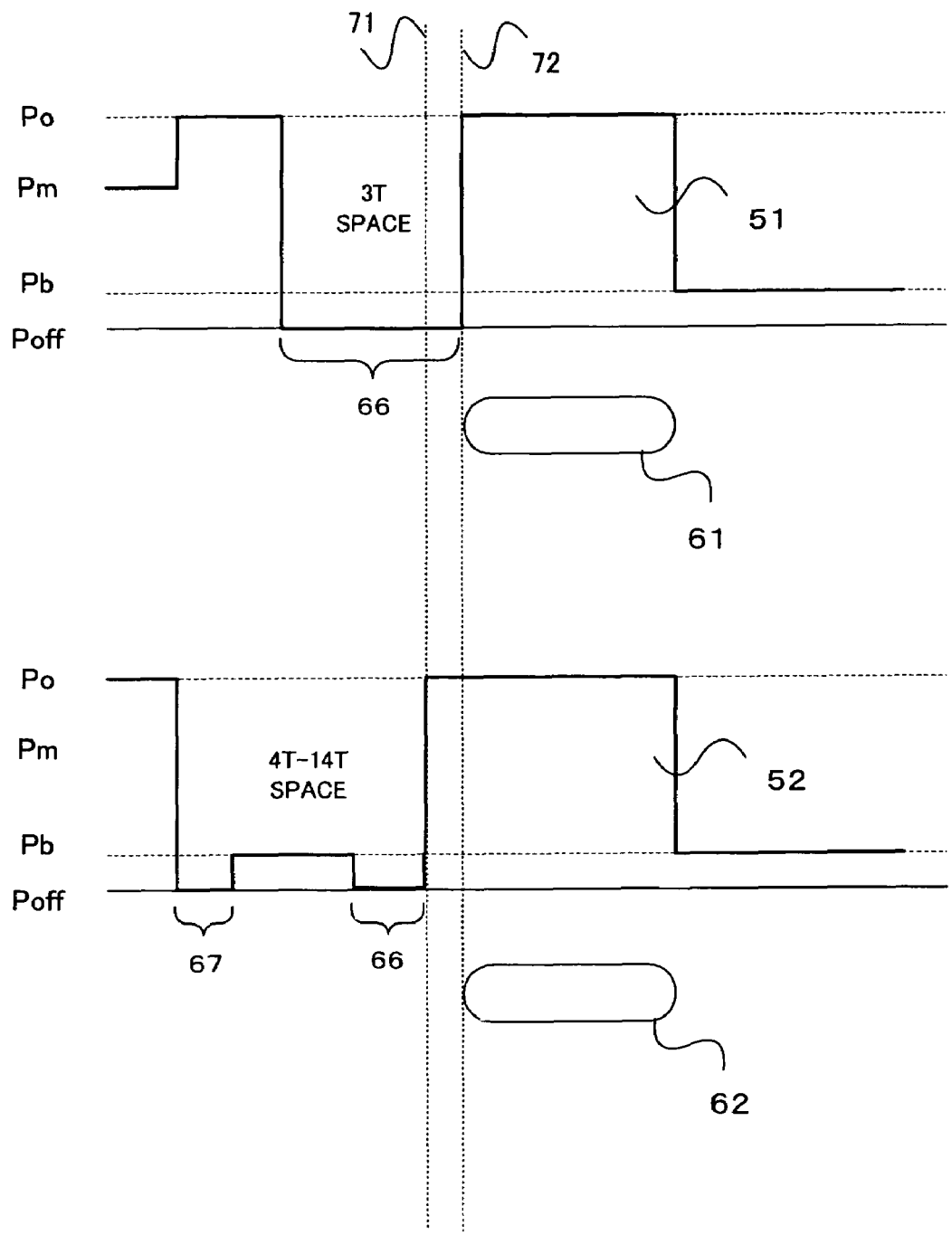
FIG. 12 is a waveform diagram showing an example of a strategy according to a modification of the present invention.

In the strategy shown in FIG. 9, in the 4T to 14T space period, the off-pulse period 66 is provided at the back end portion. The off-pulse period 66 has the effect of reducing the adverse effect of the thermal interference to the formation of the front end portion of the subsequent mark. In addition, as shown in a lower part of FIG. 12, the off-pulse period 67 may be also provided at the front end portion of the 4T to 14T space. The off-pulse period 67 has the effect of reducing the adverse effect of the thermal interference to the formation of the back end portion of the mark located ahead of the space. Therefore, as shown at the lower part of FIG. 12, if the off-pulse periods 67 and 66 are provided at the front end portion and the back end portion, respectively, it becomes possible to suppress the adverse effect of the thermal interference to the formation of the marks ahead of and behind the space.

In the above-mentioned embodiment, the entire period of the 3T space is the off-pulse period, and the part of the 4T to 14T space is the off-pulse period. Instead, the entire 3T and 4T space may be the off-pulse period, and a part of the 5T to 14T space may be the off-pulse period.

INDUSTRIAL APPLICABILITY

The information recording apparatus and the information recording method according to the present invention can be used for a DVD recorder and the like which perform the recording and reproduction of the optical disc with high density such as a DVD capable of recording, with high density, various kinds of information such as video, sound and data for consumer use or for business. In addition, they can be also used for the information recording and reproduction apparatus such as a drive apparatus capable of being loaded on or connected with various kinds of computers for consumer use or for business.

The invention claimed is:

1. An information recording apparatus which irradiates a laser light on a recording medium and forms a recording mark corresponding to a recording signal, comprising:
   a light source which emits the laser light; and
   a signal generating unit which generates a recording pulse signal driving the light source based on the recording signal,
   wherein the recording pulse signal has a mark period for forming the recording mark and a space period for forming no recording mark,
   wherein when the space period is equal to or smaller than a predetermined length, the space period includes an off pulse period during its entire period, the off pulse period having a level lower than a bias power level, and
   wherein when the space period is larger than the predetermined length, the space period includes the off pulse period at a back end portion, which is positioned immediately before the mark period subsequent to the space period larger than the predetermined length.

2. The information recording apparatus according to claim 1, wherein the space period larger than the predetermined length includes the off pulse period at a front end portion of the space period larger than the predetermined length.

3. The information recording apparatus according to claim 1, wherein the predetermined length is a shortest space length.

4. The information recording apparatus according to claim 1, wherein the level of the off pulse period is a level at which the laser pulse is not emitted from the light source.

5. The information recording apparatus according to claim 1, wherein a front end portion of the mark period subsequent to the space period equal to or smaller than the predetermined length is located behind a front end portion of the mark period subsequent to the space period larger than the predetermined length for each mark period of a same length.

6. The information recording apparatus according to claim 1, wherein the predetermined length is one of 3T and 4T.

7. An information recording method which irradiates a laser light on a recording medium and forms a recording mark corresponding to a recording signal, comprising:
   a signal generation process which generates a recording pulse signal based on the recording signal; and
   an irradiation process which irradiates a laser pulse on the recording medium based on the recording pulse signal,
   wherein the recording pulse signal has a mark period for forming the recording mark and a space period for forming no recording mark,
   wherein when the space period is equal to or smaller than a predetermined length the space period includes an off pulse period during its entire period, the off pulse period having a level lower than a bias power level, and
   wherein when the space period is larger than the predetermined length the space period includes the off pulse period at a back end portion, which is positioned immediately before the mark period subsequent to the space period larger than the predetermined length.

8. The information recording method according to claim 7, wherein the predetermined length is one of 3T and 4T.

* * * * *